United States Patent [19]

Cho et al.

[11] Patent Number: 5,392,881
[45] Date of Patent: Feb. 28, 1995

[54] DEVICE FOR DAMPENING VIBRATORY MOTION

[75] Inventors: Chahee P. Cho, Portsmouth, R.I.; John Y. Hung, Auburn, Ala.

[73] Assignee: The United States of America as represented by the Secretary of the Navy, Washington, D.C.

[21] Appl. No.: 134,191

[22] Filed: Oct. 6, 1993

[51] Int. Cl.⁶ .............................................. F16F 15/03
[52] U.S. Cl. ...................................... 188/267; 310/15; 310/37
[58] Field of Search ................... 188/267; 310/12, 15, 310/17, 20, 36, 37, 93

[56] References Cited

U.S. PATENT DOCUMENTS

| | | | |
|---|---|---|---|
| 2,636,139 | 4/1953 | Winget | 310/12 X |
| 2,774,895 | 12/1956 | Zuckermann | 310/93 |
| 2,906,899 | 9/1959 | Geneslay | 188/267 X |
| 3,929,390 | 12/1975 | Simpson | 310/90.5 |
| 4,912,343 | 3/1990 | Stuart | 310/12 X |

Primary Examiner—Robert J. Oberleitner
Assistant Examiner—Kevin D. Rutherford
Attorney, Agent, or Firm—Michael J. McGowan; Prithvi C. Lall; Michael F. Oglo

[57] ABSTRACT

There is presented a device for dampening vibratory motion. The device comprises a ferromagnetic housing, a non-magnetic, electrically conductive wall upstanding in the housing, and a plunger assembly. The plunger assembly includes a magnetic body movable in the housing adjacent the wall, and connector structure extending from the body and in communication with a vibratory energy source.

22 Claims, 4 Drawing Sheets

DEVICE FOR DAMPENING VIBRATORY MOTION

STATEMENT OF GOVERNMENT INTEREST

The invention described herein may be manufactured by and used by or for the Government of the United States of America for governmental purposes without payment of any royalties thereon or therefor.

BACKGROUND OF THE INVENTION (1) Field of the Invention

This invention relates to an improved device for dampening vibrational motion.

(2) Description of the Prior Art

It is well known to dampen vibrational motion through the interaction of a plunger and a fluid in an enclosed chamber of a housing. Typically, the plunger is fixed to a moving part, and the housing is fixed to a stationary part, or another moving part. This type of dampening device is used to dampen motion along the axis of the rotary plunger, and has no facility for dampening rotary motion about the axis of the plunger.

The energy which such prior art dampeners can absorb and how quickly energy can be absorbed depends upon parameters such as size of the plunger, viscosity, temperature, aeration, volume and pressure of the fluid. The energy absorption characteristic for a given dampening device historically has been established by selection of an appropriate combination of such parameters.

However, the absorption characteristic is subject to substantial change over time as a result of normal use and wear. Leakage of fluid from the chamber is expected after a period of use, causing certain changes in the fluid volume and pressure, and typically a change in the fluid temperature. Further, such prior art dampeners have limited or no facility for automatic adjustment, while in use, to suit changing conditions. Still further, such devices usually require sufficient space in the direction of the plunger axis for substantial plunger travel in the fluid.

Accordingly, there is a need for a dampening device having a selected energy absorption characteristic which remains stable over time, and having facility for automatic adjustment of the energy absorption characteristic while the device is in operation. Further, there is a need for such a device not requiring fluid for absorption of energy. Further, there is a need for such a device as can absorb motion along the axis of the plunger and rotary motion around the axis of the plunger. Still further, there is a need for dampening devices not requiring lengthy travel of a piston in a cylinder for activation, therefore not requiring undue extent of space along the axis of the plunger.

SUMMARY OF THE INVENTION

It is, therefore, an object of the invention to provide a device for dampening vibratory motion, the device having a selected energy absorption characteristic which remains stable over time and which is automatically adjusted while the device is in operation.

A further object of the invention is to provide such a device wherein fluid is not required for the operation thereof and a lengthy fluid path to accommodate piston travel is not required, permitting use of shorter devices.

A still further object of the invention is to provide such a device having capability for absorption of motion along the axis of the plunger and rotary motion around the axis of the plunger.

With the above and other objects in view, as will hereinafter appear, a feature of the present invention is the provision of a device for dampening vibratory motion. The device comprises a ferromagnetic housing, non-magnetic, electrically conductive wall means upstanding in the housing, and a plunger assembly. The plunger assembly comprises magnetic body means moveable in the housing adjacent the conductive wall means, and connector means extending from the body means and in communication with a vibratory energy source.

The above and other features of the invention, including various novel details of construction and combinations of parts, will now be more particularly described with reference to the accompanying drawings and pointed out in the claims. It will be understood that the particular devices embodying the invention are shown by way of illustration only and not as limitations of the invention. The principles and features of this invention may be employed in various and numerous embodiments without departing from the scope of the invention.

BRIEF DESCRIPTION OF THE DRAWINGS

Reference is made to the accompanying drawings in which is shown illustrative embodiments of the invention, from which its novel features and advantages will be apparent.

In the drawings.

DESCRIPTION OF THE PREFERRED EMBODIMENTS

Figure 1:
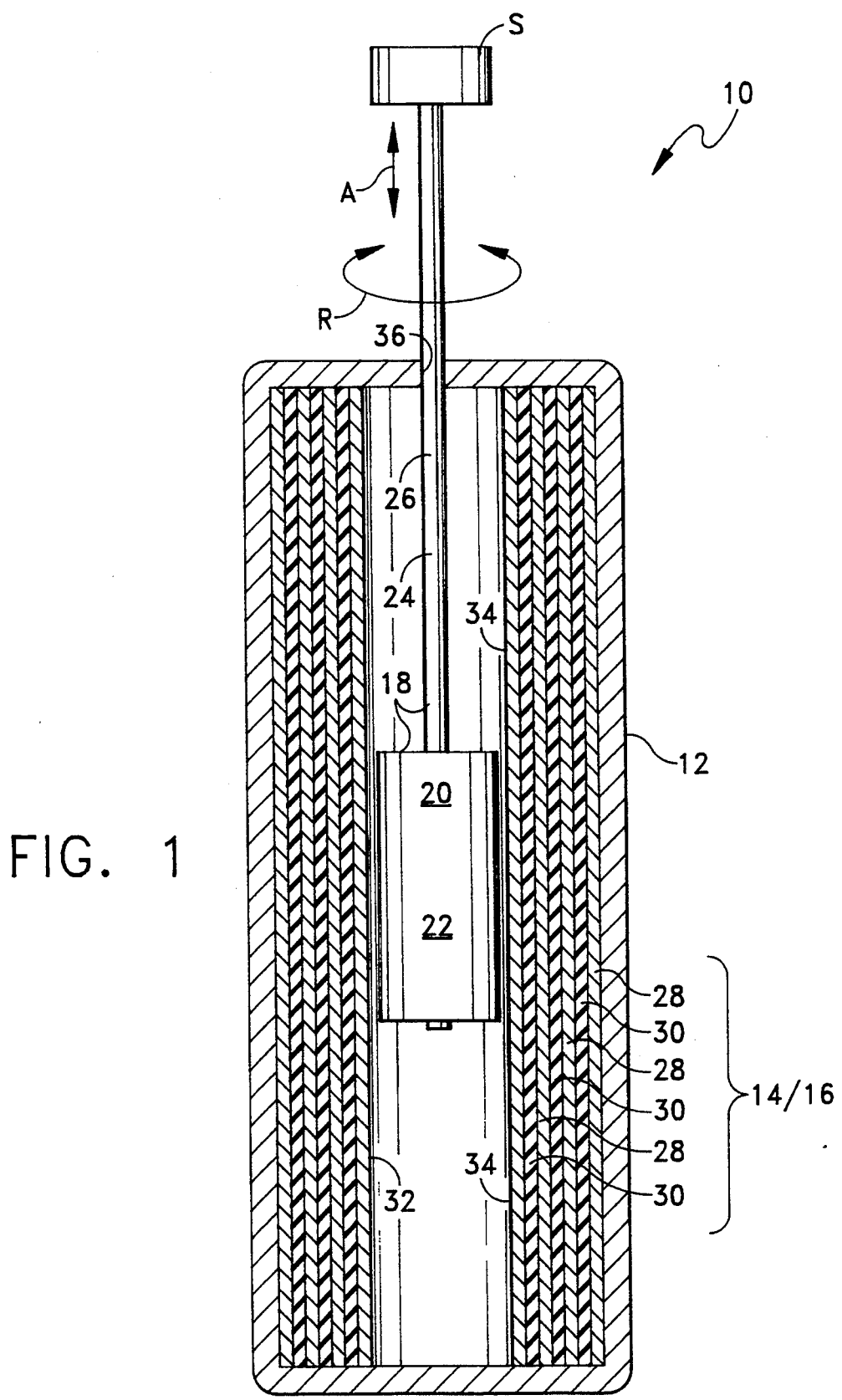
FIG. 1 is a partly sectional, partly diagrammatic view of one form of dampening device illustrative of an embodiment of the invention.

Referring to FIG. 1, there will be seen an illustrative embodiment of a vibratory motion dampening device 10. The device includes a ferromagnetic housing 12, non-magnetic, electrically conductive wall means 14 in the form of a sleeve 16 upstanding in the housing, and a plunger assembly 18, including a magnetic body 20 in the form of a piston 22 moveable in housing 12 adjacent wall means 14, and connector means 24 in the form of a rod 26 extending from body 20 and in communication with a vibratory energy source S.

Rod 26 is moveable axially of the rod, indicated by the arrow A in FIG. 1, and is rotatable, indicated by the arrow R in FIG. 1. Piston 22 is fixed to rod 26 and is similarly moveable both axially and rotatably in sleeve 16.

Figure 2:
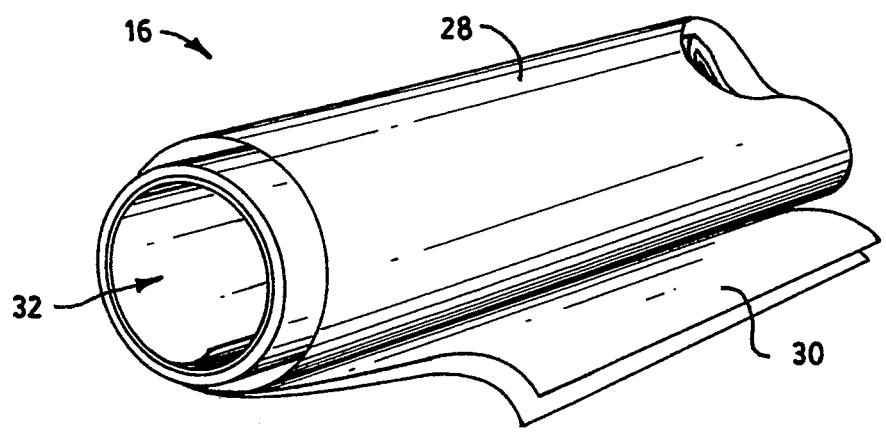
FIG. 2 is a perspective view of a portion of one embodiment of a sleeve component of the device of FIG. 1.

Sleeve 16 may be constructed, as illustrated in FIG. 2, by rolling a sheet 28 of electrically conductive material with a sheet 30 of insulating material to form a central opening 32. Conductive sheet 28 preferably is of copper, but may be of any electrically conductive, non-magnetic material, such as aluminum. Alternatively, sleeve 16 may be constructed by nesting different diameter cylinders of conductive material separated by cylinders of insulating material. Alternatively, sleeve 16 may comprise a single layer of electrically conductive, non-magnetic material.

Piston 22 of plunger assembly 18 is slidably disposed in central opening 32 of sleeve 16. The piston is a permanent magnet. Preferably, piston 22 is of neodymium iron boron (NeFeB) or samarium-cobalt (SmCo), but may be of any material which generates a permanent magnetic field appropriate for a given dampening application.

Sleeve opening 32 preferably is provided with a ceramic liner 34 which covers the inside surface of sleeve 16. While a ceramic liner is preferred, liner 34 may be of any non-magnetic electrically insulative material capable of withstanding the heating effects, and/or other conditions, created by the relative motion between piston 22 and sleeve 16.

Housing 12 covers sleeve 16 and closes the ends of sleeve central opening 32. Housing 12 optimally orients magnetic field lines such that the lines are perpendicular to the cylindrical surfaces of each conductive sheet layer 28 in sleeve 16. The housing also insures that electromagnetic force generated by device 10 is retained within the device, so as not to transmit noise to other electrical devices, such as radios, and the like. Housing 12 is provided with an opening 36 at one end thereof with the rod 26 slidably disposed therein. Typically, housing 12 is secured to a non-moving structure and rod 26 is secured to the vibratory source, but in some instances rod 26 is connected to the stationary structure and housing 12 to the moving structure. In still other instances, both the housing and the rod are secured to moving structures.

In operation, when rod 26 moves in response to vibratory energy from source S, piston 22 moves inside sleeve 16, inducing a voltage and current (i.e., an eddy current) in each conductive layer 28 of sleeve 16. The conductive layers, in turn, generate a magnetic field in proportion to the current induced in each layer 28. The magnetic field generated by layers 28 opposes the magnetic field of the piston 22 and thereby opposes the movement of piston 22 within sleeve opening 32.

It is well known in the art that electromagnetic force induced in a material relates to the rate of change of magnetic flux through the material. Thus, there are three parameters of particular importance; the surface area of layers 28 exposed to the piston's magnetic flux, the relative speed of piston 22, and the piston's field strength. The term relative speed is used to describe the speed associated with the relative motion between piston 22 and sleeve 16, since either or both the piston and sleeve can be in motion with respect to the other. As such, the relative speed of the piston directly affects the rate change in the flux field. For example, a larger current is induced when piston 22 moves faster through opening 32, all other things being equal. The surface area affects the number of flux lines which can induce a current or voltage. With a larger surface area, more flux lines affect the conductive material, thereby inducing larger currents and voltages.

The surface area exposed also relates to the motion of the magnet. If the magnet's motion is along the rod axis in direction A, the cylindrical surface along the length of sleeve 16 will generate the current and magnetic field. If the motion is rotational, in direction R, it is the cylindrical surface area about the piston 22 (i.e., the length of the magnetic body) which generates the current and magnetic field. In either case, the magnetic field generated by conductive layers 28 opposes either the linear or rotational motion of piston 22. In this way, device 10 opposes vibratory motion, both rotational and linear. The dampening device 10 maximizes the eddy current produced so the drag on the magnetic body from the magnetic field created by the eddy current is maximized.

Thus, there is provided a dampening device for which energy absorption characteristics remain stable over an extended period of time, which requires no fluid for its operation, and which can absorb reciprocatory motion along the axis of the plunger assembly and rotary motion about the axis of the plunger assembly. As further noted above, in addition to the foregoing benefits, it is desirable that the dampening device have facility for automatic adjustment of the energy absorption characteristics while the device is in operation.

Figure 3:
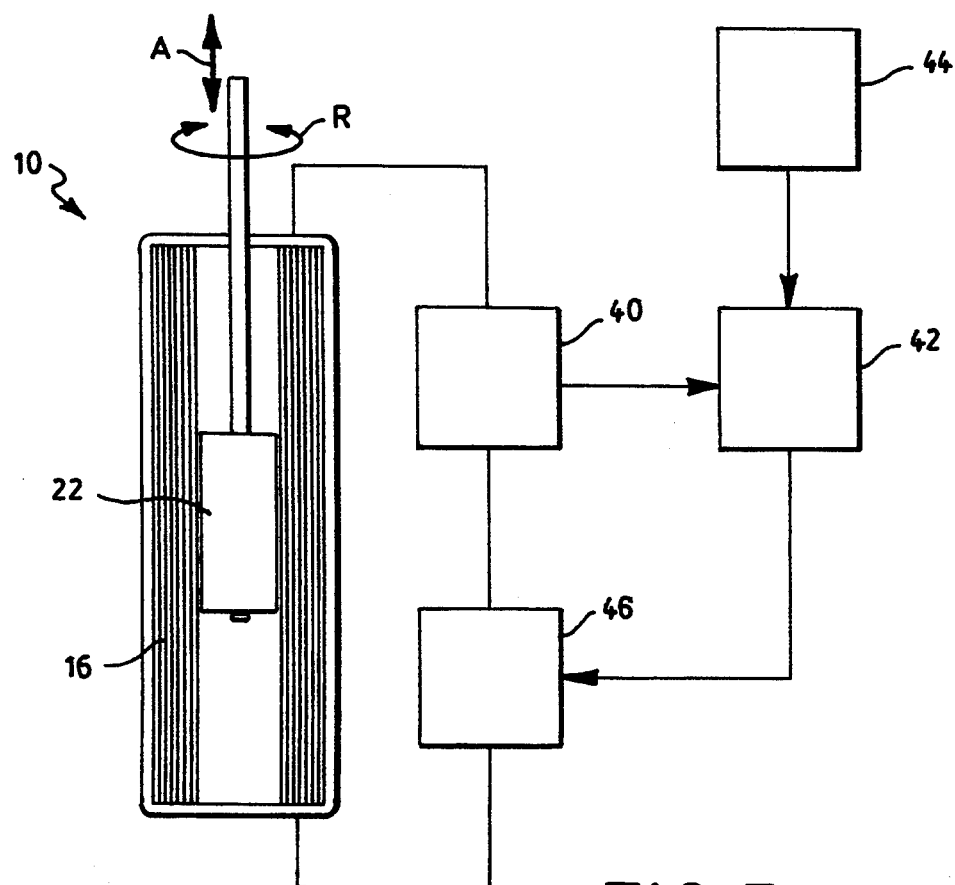
FIG. 3 is a diagrammatic representation of a control means for the device of FIG. 1 and other dampening devices disclosed herein.

There is shown in FIG. 3 an arrangement for actively controlling the eddy current and the associated magnetic field while the dampening device 10 of the present invention is functioning. While the magnetic body 20, or piston 22, is at rest no voltage or current is produced or induced. However, when there is relative motion between piston 22 and sleeve 16, an eddy current and voltage is induced in the conductive material 28 of sleeve 16.

The eddy current or voltage induced by the relative motion is measured by a sensing device 40 and a signal representative of the measured current or voltage is provided to a controller 42. Controller 42 compares the measured value to a reference value provided, for example, by a reference source 44. In a predetermined fashion, controller 42 directs a current controlling device 46 to modify (e.g., increase or decrease) the eddy current. In this manner, both the eddy current flowing in conductive material 28 and the associated magnetic field are automatically modified in a preplanned and predetermined fashion.

The controller 42 can be preprogrammed to adjust dampening device 10 to produce any modified dampening characteristic. For example, controller 42 can be programmed so that dampening device 10 acts as if it were constructed differently. In this way, one can construct one dampening device and have it used in a number of different applications.

Though illustrated in FIG. 3 in conjunction with a dampening device as shown in FIG. 1, the arrangement for automatically modifying the absorption characteristics of the dampening device is equally suitable for use in conjunction with alternative devices to be described herein below.

Figure 4:
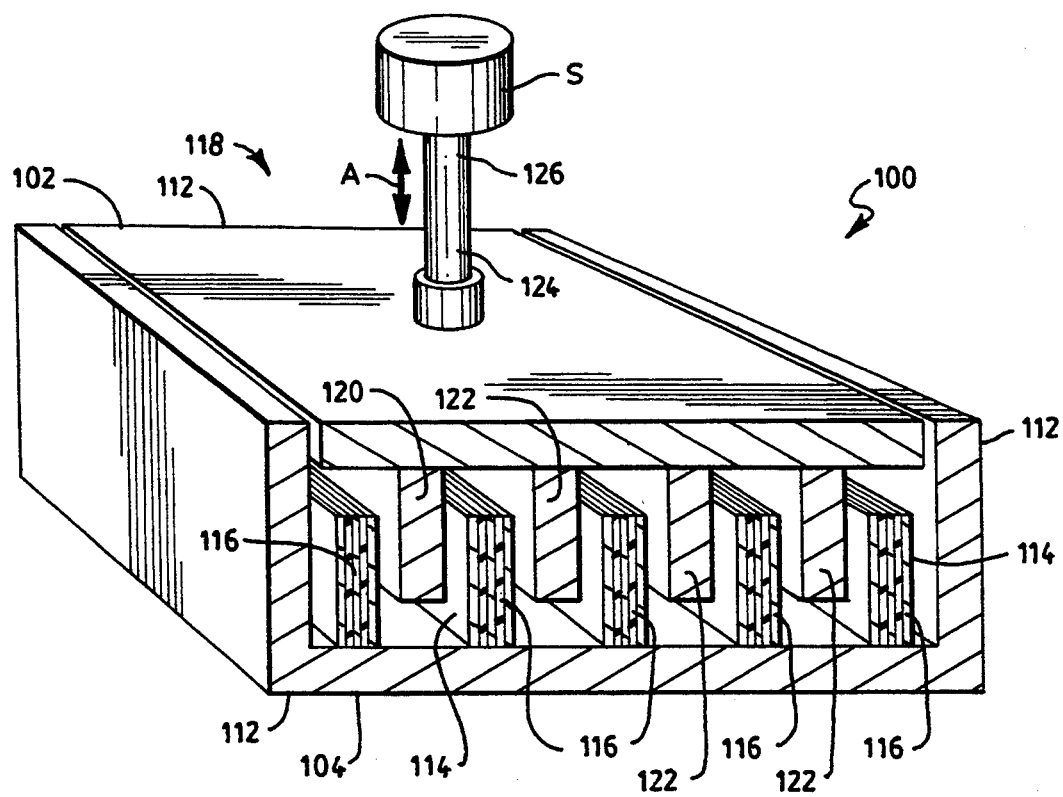
FIGS. 4 and 5 are partly sectional, partly diagrammatic views of alternative embodiments of dampening devices.

In FIG. 4 there is shown an alternative embodiment comprising a dampening device 100 for dampening vibratory motion only in direction A. Dampening device 100 is provided with a ferromagnetic housing 112, non-magnetic, electrically conductive wall means 114 in the form of a plurality of plates 116 upstanding in the housing 112, and a plunger assembly 118, including magnetic bodies 120 in the form of plates 122 movable in housing 112 adjacent wall means 114, and connection means 124 in the form of a rod 126 fixed to a movable portion 102 of housing 112 and in communication with the vibratory motion source S.

The non-magnetic, electrically conductive plates 116 are affixed to a stationary portion 104 of housing 112 and the magnetic plates 122 are affixed to the movable portion 102 of housing 112. The housing portions 102 and 104 are typically connected, respectively, to the motion source S and a fixed structure (not shown). As suggested above, the reverse may be true in some instances, and in other cases both portions 102 and 104 may be fixed to movable structures. As shown in FIG. 4, conductive and magnetic plates 116, 122 are fixed to housing portions 102, 104 such that magnetic plates 122 are disposed adjacent conductive plates 116.

Each electrically conductive plate 116 may be a single flat sheet of conductive material, or may be a flat laminated plate having a plurality of conductive layers, each separated by insulating material, much like the above described sleeve 16. The magnet material is also in the form of flat plates. Unlike the two-degree-of-freedom device 10 described above, both sides of the magnetic plates 122 are utilized to induce currents in the conductive plates 116. The ferromagnetic housing includes both the top and bottom sections 102, 104 as shown in FIG. 4.

While this device dampens only bi-directional motion, in direction A along a single axis, it is a more compact device than the sleeve dampening device 10 described above. Thus, a dampening device can be provided where there is little space vertically between the fixed and moving parts, but there is space laterally or horizontally between the two parts (i.e., the dampening device can be wide but thin). This is possible because the dampening characteristic relates to the opposing surface areas of the conductive and magnetic plates 116, 122.

Figure 5:
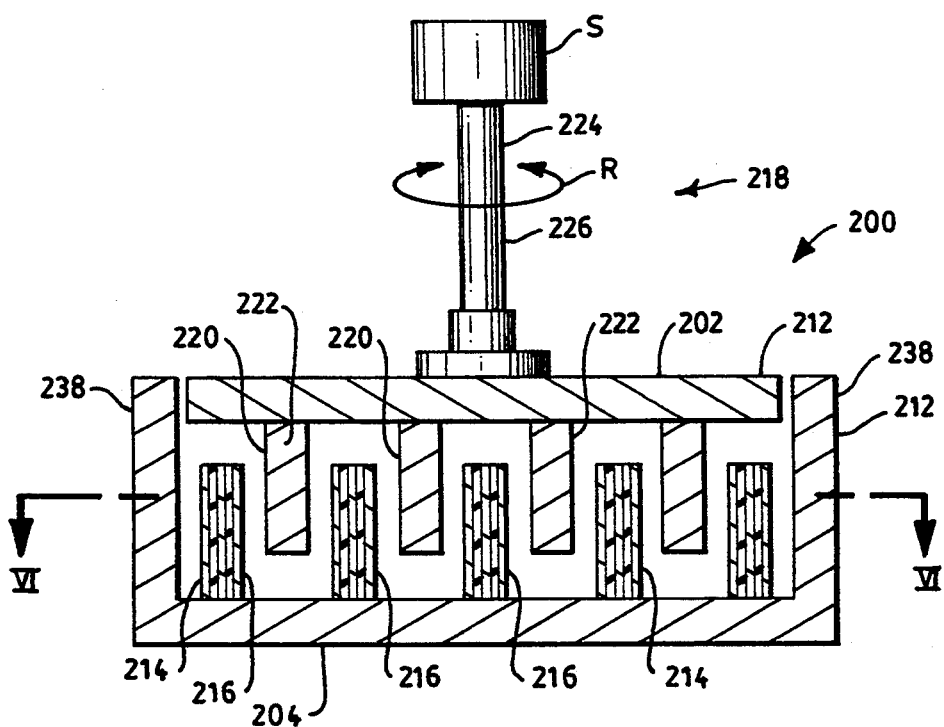
Figure 6:
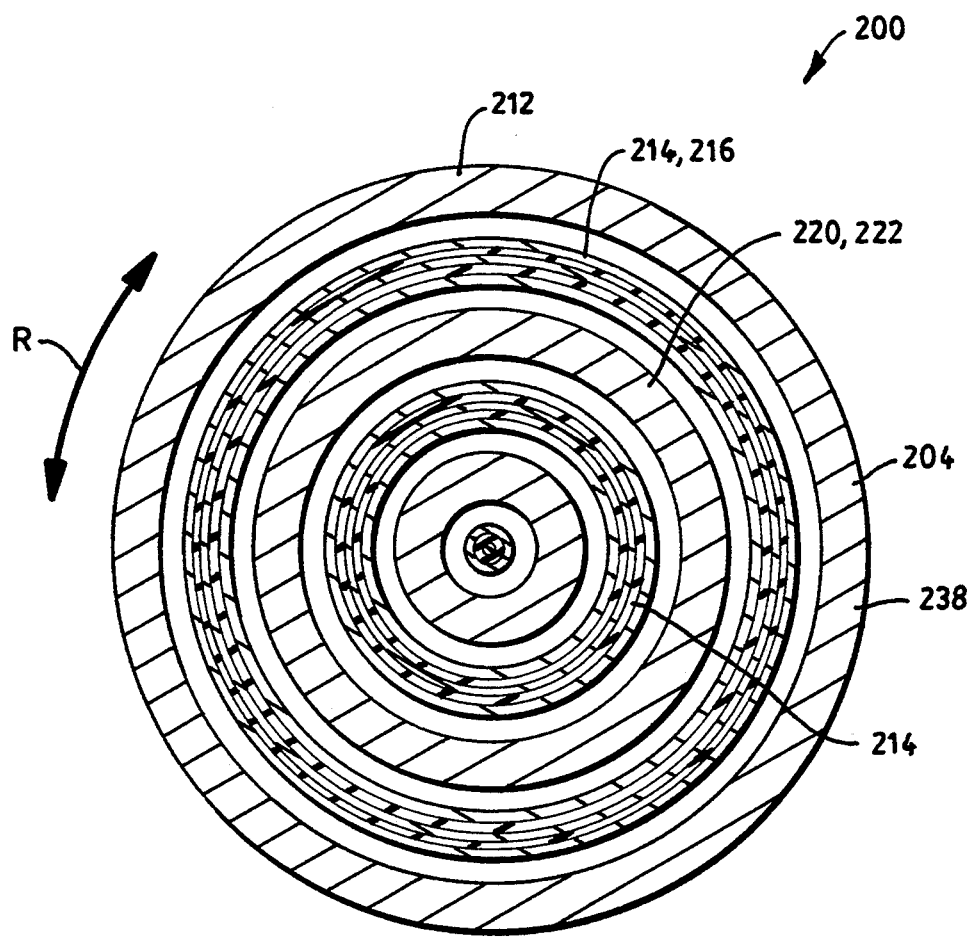
FIG. 6 is a sectional view taken along line VI—VI of FIG. 5.

A torsional dampening device 200, as shown in FIGS. 5 and 6, dampens rotational motion in direction R. Conceptually, device 200 is similar to vertical dampening device 100, described above. Device 200 includes a ferromagnetic housing 212 including a movable portion 202 and a stationary portion 204. Device 200 further includes non-magnetic electrically conductive wall means 214 comprising a plurality of electrically conductive cylinders 216 affixed to the stationary section 204 and a plunger assembly 218 including a magnetic body means 220 comprising a plurality of magnetic material cylinders 222 affixed to the housing movable portion 202. Device 200 further includes a connector means 224 comprising a rod 226 interconnecting one of the housing portions and the vibratory energy source S. The movable and stationary portions 202, 204 are, respectively, connected to the vibratory energy sources (i.e., the moving part) and the fixed part or structure (not shown). When the movable portion 202 rotates relative to the stationary portion 204, a current is induced in the cylindrical conductive plates 216, generating a magnetic field opposing the rotatory motion.

Each electrically conductive cylinder 216 may be a single cylinder of conductive material, or may be a laminated cylinder having a plurality of conductive layers, each separated by insulating material, much like the above described sleeve 16. The ferromagnetic jacketing material is incorporated into both movable and stationary portions 202, 204 as shown in FIG. 5. Like the vertical dampening device 100 described above, both sides of the magnetic cylinders 222 are utilized to induce currents in the conductive cylinders 216.

FIG. 6 illustrates the radially spaced relation of conductive cylinders 216 and magnetic cylinders 222. A portion 238 of the housing stationary portion 204 forms an outer cylinder of ferromagnetic material to optimally orient magnet flux lines perpendicular to the conductive cylinder surfaces.

Thus, there are provided dampening devices which have stable dampening characteristics because in each embodiment the dampening characteristic is governed by materials and construction of the dampening device. These devices, however, can be adapted to actively change or modify the dampening characteristic while the device is functioning, or for a given application. The devices of the present invention do not require the use of fluids to absorb energy, and can automatically adjust the energy absorption characteristic while in operation.

The embodiment illustrated in FIG. 1 can absorb vibrational energy in two degrees of freedom (i.e., linear motion along one axis and rotational motion about the same axis).

The embodiments illustrated in FIGS. 4 and 5 provide more compact devices for removing vibrational energy, in one embodiment linear energy, and in the other, rotational energy.

It is to be understood that the present invention is by no means limited to the particular constructions herein disclosed and/or shown in the drawings, but also comprises any modifications or equivalents within the scope of the claims.

What is claimed is:

1. A device for dampening vibratory motion, said device comprising:
    a ferromagnetic housing;
    non-magnetic, electrically conductive wall means fixed to said housing and upstanding in said housing, said wall means having alternating layers of non-magnetic electrically conductive material and electrically insulative material;
    a plunger assembly comprising magnetic body means movable in said housing adjacent said wall means; and
    connector means extending from said body means and in communication with a vibratory energy source.

2. The device in accordance with claim 1 wherein said housing is of a cylindrical configuration.

3. The device in accordance with claim 2 wherein said housing is provided with an opening at one end thereof, said connector means extending through said opening.

4. The device in accordance with claim 3 wherein said wall means comprises a sleeve disposed in said housing and having a central opening extending axially thereof.

5. The device in accordance with claim 4 wherein said plunger assembly magnetic body means comprises a piston slidably disposed in said central opening of said sleeve and movable axially and rotatably in said central opening.

6. The device in accordance with claim 5 wherein said connector means comprises a rod fixed to said piston, extending through said opening in said end of said housing, and in communication with said vibratory energy source.

7. The device in accordance with claim 4 wherein said sleeve comprises sheets of said non-magnetic electrically conductive material and sheets of said electrically insulative material rolled to form said sleeve with said alternating layers.

8. The device in accordance with claim 7 wherein said sleeve further comprises a liner of non-magnetic electrically insulative material on the interior thereof and defining said central opening.

9. The device in accordance with claim 7 wherein said sleeve further comprises a concentric tube on the interior thereof and defining said central opening, said tube being of a non-magnetic electrically insulative material.

10. The device in accordance with claim 4 wherein said sleeve comprises concentric tubes of said non-magnetic electrically conductive material and said electrically insulative material fitted together to form said sleeve.

11. The device in accordance with claim 4 wherein said sleeve further comprises a ceramic liner on the interior thereof defining the wall of said sleeve central opening, said piston being slidably movable in said liner.

12. The device in accordance with claim 1 wherein said housing comprises first and second portions movable axially relative to each other.

13. The device in accordance with claim 12 wherein said non-magnetic electrically conductive wall means comprises conductive plates upstanding from one of said housing portions.

14. The device in accordance with claim 13 wherein said conductive plates comprise laminated plates having alternating layers of non-magnetic electrically conductive material and electrically insulative material.

15. The device in accordance with claim 13 wherein said plunger assembly comprises the other of said housing portions, and said magnetic body means comprises magnetic plates depending from said other of said housing portions, each of said magnetic plates being adjacent at least one of said conductive plates and axially movable relative thereto.

16. The device in accordance with claim 15 wherein said connector means comprises a rod extending from one of said housing portions to said vibratory energy source.

17. The device in accordance with claim 2 wherein said housing comprises first and second portions movable rotatably relative to each other.

18. The device in accordance with claim 17 wherein said non-magnetic electrically conductive wall means comprises conductive cylinders upstanding from one of said housing portions.

19. The device in accordance with claim 18 wherein said conductive cylinders comprise laminated cylinders having alternating layers of non-magnetic electrically conductive material and electrically insulative material.

20. The device in accordance with claim 18 wherein said plunger assembly comprises the other of said housing portions, and said magnetic body means comprises magnetic cylinders depending from said other of said housing portions, each of said magnetic cylinders being adjacent at least one of said conductive cylinders and rotatably movable relative thereto.

21. The device in accordance with claim 20 wherein said connector means comprises a rod extending from one of said housing portions to said vibratory energy source.

22. The device in accordance with claim 1, further comprising sensing means for detecting and measuring at least one of current and voltage induced by relative motion between said wall means and said magnetic body, and for sending a signal indicative thereof, a reference source for storing and providing reference signals, a controller for receiving said signal from said sensing means and comparing said signal to a reference signal received from said reference source, and for sending a signal indicative of a programmed response to said comparison of said sensing means signal and said reference source signal, and a current controlling means for modifying eddy current in said dampening device, whereby to automatically modify the eddy current flowing in said conductive wall means and an associated magnetic field in a predetermined fashion.

* * * * *